United States Patent [19]

Masuda et al.

[11] Patent Number: 5,952,038
[45] Date of Patent: Sep. 14, 1999

[54] PROCESS FOR FORMING PHOSPHOR SCREEN OF MONOCHROME CATHODE RAY TUBE AND PHOSPHOR SCREEN PRODUCED THEREBY

[75] Inventors: Junichi Masuda; Tadayuki Tsuchiyama, both of Osaka, Japan

[73] Assignee: Matsushita Electronics Corporation, Osaka, Japan

[21] Appl. No.: 08/926,518

[22] Filed: Sep. 10, 1997

[30] Foreign Application Priority Data

Sep. 20, 1996 [JP] Japan .................................. 8-249345

[51] Int. Cl.$^6$ ........................................................ B05D 5/06
[52] U.S. Cl. ........................ 427/73; 427/273; 427/336; 427/287; 427/165; 313/416
[58] Field of Search .............................. 427/73, 336, 273, 427/287, 165; 313/416

[56] References Cited

U.S. PATENT DOCUMENTS

| | | | |
|---|---|---|---|
| 2,662,829 | 12/1953 | Krause | 427/73 |
| 4,513,024 | 4/1985 | Morita et al. | 427/73 |
| 4,758,449 | 7/1988 | Kimura et al. | 427/73 |

FOREIGN PATENT DOCUMENTS

| | | |
|---|---|---|
| 63-279539 | 11/1988 | Japan . |
| 5-230455 | 9/1993 | Japan . |
| 5-263076 | 10/1993 | Japan . |
| 5-302083 | 11/1993 | Japan . |

*Primary Examiner*—Janyce Bell
*Attorney, Agent, or Firm*—Merchant & Gould

[57] ABSTRACT

This invention provides a process for forming a phosphor screen of a monochrome cathode ray tube (projection tube) which has an improved luminance remaining property. The phosphor particles are settled on an inner surface of a glass bulb with a binder of $SiO_2$ to form a phosphor layer, in which the amount of $SiO_2$ is reduced by rinsing with a water-based liquid like deionized water and a PVA solution before forming an organic layer on the phosphor layer. The phosphor screen has an improved luminance remaining property that is close to that of a direct viewing color cathode ray tube, without lowering the screen quality.

15 Claims, 8 Drawing Sheets

PROCESS FOR FORMING PHOSPHOR SCREEN OF MONOCHROME CATHODE RAY TUBE AND PHOSPHOR SCREEN PRODUCED THEREBY

FIELD OF THE INVENTION

This invention relates to a process for forming a phosphor screen of a monochrome cathode ray tube used as a projection tube for a projection TV, a projection monitor and the like, and a phosphor screen produced thereby. More particularly, the present invention provides a process for forming a phosphor screen of a monochrome cathode ray tube that has an improved luminance remaining rate.

BACKGROUND OF THE INVENTION

In order to form a phosphor layer (a phosphor screen) of a cathode ray tube, a so-called settling method has been widely adopted, in which phosphor particles in a suspension are settled on an inner screen surface of a main body of a cathode ray tube to form a sedimentary layer. The sedimentary layer of the phosphor particles is dried to obtain a phosphor layer.

A projection tube for a projection TV, a projection monitor and the like (a monochrome cathode ray tube) is usually used under conditions in which a plate voltage and an anode current are higher (15%–20% higher for the plate voltage and about five times higher for the anode current) than those of a direct viewing color cathode ray tube to compensate for a decrease in the quantity of light. Therefore, the phosphor layer on the inner screen surface receives a stronger stimulus, which accelerates the deterioration of the luminance remaining rate.

For improving such a deterioration, Japanese Laid-open Patent Publication No. 5-230455 discloses a phosphor layer formed out of a rare earth phosphor material including Lu (lutetium). Japanese Laid-open Patent Publication No. 5-263076 discloses a phosphor layer formed out of a rare earth phosphor material including Yb (ytterbium). Japanese Laid-open Patent Publication No. 5-302083 discloses a phosphor layer formed out of a rare earth phosphor material including Ce (cerium). Japanese Laid-open Patent Publication No. 63-279539 discloses a phosphor layer formed out of a phosphor slurry having a specific weight ratio of a phosphor material to a binder material.

One of the causes of the deterioration of a luminance remaining rate in a projection tube for a projection TV and the like is a change for the worse of luminance in the phosphor material itself included in the phosphor layer. Besides, in the settling method, since water glass (alkali silicate) is added to a phosphor layer as a binder from a phosphor suspension to increase the adhesive strength among phosphor particles, a change of color in silicon dioxide ($SiO_2$) seriously causes the deterioration of a luminance remaining rate. Viewed in this light, $SiO_2$ should be reduced as much as possible. However, when the water glass added from a phosphor suspension is made to decrease to reduce the $SiO_2$ in a phosphor layer, the phosphor screen tends to become less fine because of a decrease of the adhesive strength among phosphor particles, thereby making screen quality worse. Such a problem can not be resolved by forming a phosphor layer out of a rare metal phosphor material including Lu, Yb or Ce, nor can the problem be resolved by forming a phosphor layer out of a phosphor slurry having a specific weight ratio of a phosphor material to a binder material.

SUMMARY OF THE INVENTION

An object of the present invention is to provide a process for forming a phosphor screen of a monochrome cathode ray tube which can give a satisfactory luminance remaining rate without lowering a screen quality seriously. The luminance remaining rate constitutes an index to durability.

In order to achieve the above object, the present invention provides a process for forming a phosphor screen of a monochrome cathode ray tube, which comprises: settling phosphor particles on the inner surface of a main body of a monochrome cathode ray tube from a phosphor suspension including the phosphor particles and $SiO_2$ to form a phosphor layer including the phosphor particles and the $SiO_2$ as a binder for the phosphor particles, and forming an organic layer on the phosphor layer, wherein the amount of $SiO_2$ in the phosphor layer is reduced before forming the organic layer.

As the amount of $SiO_2$ is reduced in the phosphor layer produced by the above process, the deterioration of a luminance remaining rate in the phosphor screen is relieved. Besides, before being reduced, the $SiO_2$ is supplied to the phosphor layer from the phosphor suspension enough to combine the phosphor particles tightly. So the phosphor particles can be prevented from moving or being carried away to keep the phosphor screen fine, when removing the phosphor suspension from the inner surface of the cathode ray tube.

It is preferable in the above process that the amount of $SiO_2$ in the phosphor layer is reduced by rinsing the phosphor layer with a water-based liquid, because the amount of $SiO_2$ can be reduced effectively. The water-based liquid is preferably selected from the group consisting of water, an aqueous solution and a dispersed system including water as a dispersing medium. The water is preferably deionized water. The aqueous solution preferably includes a polymer as a solute. The dispersed system preferably includes a colloidal silica as a dispersoid.

When rinsing the phosphor layer, it is preferable that a water-based liquid for rinsing is between 60 $cm^3$ and 1000 $cm^3$ per one gram of the phosphor particle, because the $SiO_2$ can be reduced effectively in a short time without ripping the phosphor particles out of the phosphor layer.

When rinsing the phosphor layer with an aqueous solution including a polymer as a solute, it is preferable that the phosphor layer is rinsed with water before rinsing with an aqueous solution including a polymer as a solute, because the organic layer on the phosphor layer can be smoother without raising the cost of production.

It is preferable that the phosphor layer is dried before the $SiO_2$ in the phosphor layer is reduced. It is preferable that the $SiO_2$ included in the phosphor suspension is included as alkali silicate like water glass.

It is preferable that the $SiO_2$ is included in the phosphor suspension in an amount of at least 0.95 weight % to the total weight of the phosphor suspension and a cushion solution held in the main body of the monochrome cathode ray tube before the phosphor suspension is added into the main body, because the phosphor particles can be more effectively prevented from moving or being carried away to provide a finer phosphor screen enough to eliminate a feeling of coarseness in appearance. From such a standpoint, it is preferable that the $SiO_2$ included in the phosphor layer is at least 6.7 weight % before being reduced.

It is preferable that the amount of $SiO_2$ included in the phosphor layer is not more than 5.7 weight % after being reduced, because the deterioration of a luminance remaining rate in the phosphor screen is relieved effectively.

BRIEF DESCRIPTION OF THE DRAWINGS

This invention can be better understood from the following detailed description when read in conjunction with the drawings.

DESCRIPTION OF THE PREFERRED EMBODIMENTS

As a phosphor particle in the above process, known phosphor particles for a monochrome cathode ray tube (a projection tube) can be used, whose volume-mean particle diameter is usually between 1 µm and 15 µm, preferably between 5 µm and 12 µm.

Each step of the process of this invention will be more clealy understood with the following preferred embodiments.

A predetermined amount of deionized water including a predetermined amount of phosphor particles is stirred with a stirrer like a propeller stirrer to prepare a suspension including phosphor particles. The concentration of phosphor particles in the suspension is preferably between three weight % and seven weight %.

Figure 1:
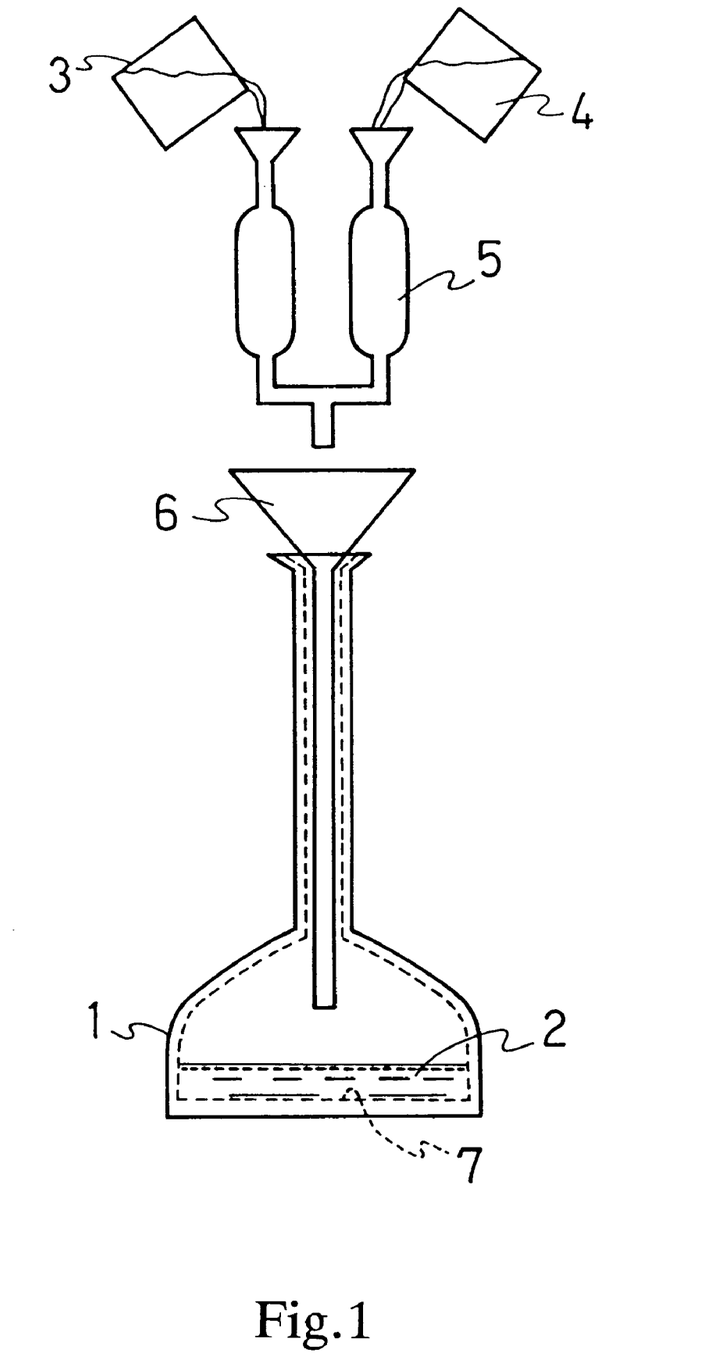
FIG. 1 is a sectional view showing a step of forming a phosphor layer in a preferred embodiment of the present invention.

As shown in FIG. 1, a predetermined amount of an aqueous solution of barium sulfate 2 is retained in the glass bulb 1 as a cushion solution. A predetermined amount of the suspension including phosphor particles 3 as described above and a predetermined concentration of an aqueous solution of water glass 4 like potassium water glass are poured into the glass bulb 1 through a mixer 5 and a funnel for pouring 6. The aqueous solution of barium sulfate 2 prevents the phosphor particles 3 from colliding against the inner surface of the glass bulb 1 like a cushion. The phosphor particles are sedimented on the inner surface 7 of the face glass plate of the glass bulb 1 to form a phosphor layer 8 after the glass bulb 1 was kept horizontal for a certain period of time, e.g. 8–20 minutes. The glass bulb 1 is tilted slowly to remove a supernatant liquid from the glass bulb 1. The glass bulb 1 is preferably tilted continuously at the rate of about 2 degrees per second. Warm water is poured on the outer surface of the glass bulb 1 to dry the phosphor layer 8 sticking to the inner surface 7 of the bulb 1.

The term "phosphor suspension" in this specification means a suspension including phosphor particles and $SiO_2$, and comprehends a mixture of the suspension including phosphor particles 3 and the aqueous solution of water glass 4 as described above. The water glass 4 in the phosphor suspension is preferably included so that the $SiO_2$ in the suspension is between 0.95 weight % and 1.05 weight % with respect to the total weight of the phosphor suspension and the cushion solution. When the $SiO_2$ in the suspension is less than 0.95 weight %, the phosphor particles cannot stick so tightly to one another in the sedimentating process, increasing the chances that the phosphor particles are carried out with the supernatant liquid to make the phosphor screen less fine. When the $SiO_2$ in the suspension is more than 1.05 weight %, the luminance remaining rate tends to decrease. The concentration of the $SiO_2$ is preferably provided on the basis of the mixture of the phosphor suspension and the cushion solution as described above, because the phosphor particles are settled from the mixture of the phosphor suspension and the cushion solution to form the phosphor layer. The fineness of the phosphor screen and the appearance of coarseness on the phosphor screen is affected by the concentration of the $SiO_2$ in the phosphor layer.

Although an aqueous solution of barium sulfate is used for a cushion solution in the above process, other electrolytic solutions used as a cushion solution in this technical field like an aqueous solution of barium acetate also can be used as a cushion solution.

Figure 2:
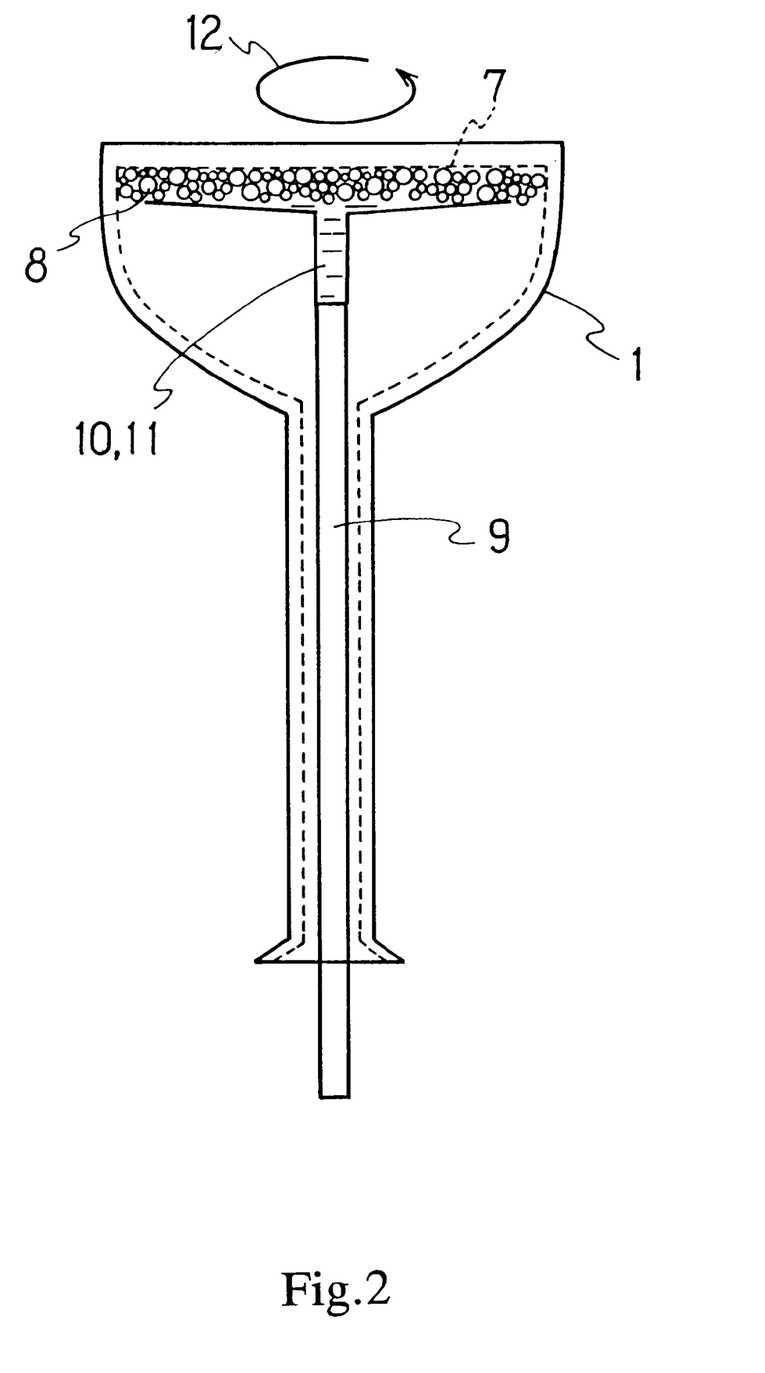
FIG. 2 is a sectional view showing a step of rinsing the $SiO_2$ away in a preferred embodiment of the present invention.

Referring now to FIG. 2, after the phosphor layer 8 on the inner surface of the face glass 7 is dried in the above process, deionized water 10 is sprayed on the phosphor layer 8 with a nozzle 9 to rinse the $SiO_2$ in the phosphor layer 8. The deionized water 10 is sprayed while making the glass bulb 1 rotate about on axis which is perpendicular to the surface of the face glass 7 to as shown by the arrow 12.

After rinsing with deionized water 10, the phosphor layer 8 is rinsed with an aqueous solution including a polymer like PVA (polyvinyl alcohol) as a solute to rinse the $SiO_2$ further. As shown in FIG. 2, an aqueous solution of PVA 11 is sprayed in the same way as described above. The solute can be selected from water-soluble polymers (water-soluble resin). The concentration of the polymer is preferably between 0.1 weight % and 0.5 weight %.

Either deionized water 10 or an aqueous solution including a polymer as a solute 11 can be sprayed on the phosphor layer 8 alone, although both of them are applied in the above process.

As an aqueous solution 11, it is possible to use an aqueous solution of synthetic polymer like polyacrylamide and soda polyacrylate or a semisynthetic polymer like methyl cellulose and viscose. It is also possible to apply a dispersed system including a dispersoid like a colloidal silica in a dispersion medium like water. Such a colloidal silica dispersed in water can be sprayed instead of deionized water 10 or the aqueous solution 11. The colloidal silica dispersed in water also can be sprayed in combination with both or either of them.

Instead of being sprayed, the liquid for the treatment as described above can be poured into the glass bulb 1 and removed from there after being kept for a predetermined period of time to rinse the $SiO_2$. Such a way of rinsing the $SiO_2$ in the phosphor layer 8 is more easily done, but has a lower efficiency of rinsing away than that in spraying. The amount of applied liquid for the treatment is preferably between 60 cm³ and 1000 cm³ per one gram of the phosphor material in the phosphor layer 8 regardless of the way of rinsing, because the $SiO_2$ can be washed away with high efficiency without ripping the phosphor particles out of the layer 8. The amount of applied liquid for the treatment is more preferably between 200 cm³ and 350 cm³ per one gram of the phosphor material.

It is preferred that the aqueous solution 11 is applied on the phosphor layer 8 in the last step of rinsing, because the polymer included in the solution 11 remains on the phosphor layer 8 to improve an adhesive property of an applied lacquer liquid for forming an organic layer on the phosphor layer 8 and to increase the smoothness of the organic layer. As the aqueous solution 11 including a polymer is more expensive than deionized water 10, it is preferred that deionized water 10 is applied in the first step and the aqueous solution 11 is applied in the second step as described above.

A phosphor screen including the phosphor layer 8 is produced by the known process as follows: a lacquer liquid is sprayed on the phosphor layer 8 in which $SiO_2$ has already been reduced to form an organic layer; a conductive coating material is applied on a predetermined area between an anode button and a neck; an aluminum film is deposited on the organic layer; and the organic layer is baked in a baking step.

An electron gun is fixed to the glass bulb 1 in which a vacuum has been produced, and a getter is heated by high frequency heating to raise the vacuum. A cathode ray tube is obtained via an aging step and a spot knocking step as cathode activating steps.

EXAMPLES

To begin with, the relationship between the $SiO_2$ concentration in the phosphor layer and the luminance remaining rate was investigated in the following.

As a cushion solution, 450 cm$^3$ of a 0.08 weight % aqueous solution of barium sulfate was poured into the glass bulb 1 having a seven-inch (about 16 cm) screen. A five weight % deionized-water suspension of phosphor particles having a volume-average diameter of 8 μm and a seven weight % aqueous solution of potassium water glass were poured into the glass bulb through a mixer and a funnel for pouring as shown in FIG. 1. A phosphor layer was allowed to settle on the inner surface of the glass bulb before removing the supernatant liquid. The settled phosphor layer was dried as described above. A monochrome cathode ray tube (a projection tube) was produced through the known and general steps. As the potassium water glass, "C type" (trade name) in the "OHKASEAL" (trade name) series made by Tokyo Ohka Kogyo Co., Ltd was used.

In the above process, various amounts of the solution of potassium water glass were mixed with 20 cm$^3$ of the above deionized-water suspension to change the concentration of $SiO_2$ with respect to the total weight of the phosphor suspension (the mixture of the suspension of phosphor particles and the aqueous solution of potassium water glass) and the cushion solution in the range between 0.65 weight % and 1.05 weight %. The amount of the added solution of potassium water glass, the $SiO_2$ concentration with respect to the total weight of the phosphor suspension and the cushion solution, and the $SiO_2$ concentration in the dried phosphor layer were as follows:

[1] when 48 cm$^3$ of a seven weight % of the solution of potassium water glass was added, the $SiO_2$ concentration with respect to the total weight of the phosphor suspension and the cushion solution was 0.65 weight % and the $SiO_2$ concentration in the dried phosphor layer was 5.5 weight %.
[2] when 52 cm$^3$ of the solution of potassium water glass was added, the $SiO_2$ concentration with respect to the total weight of the phosphor suspension and the cushion solution was 0.70 weight % and the $SiO_2$ concentration in the dried phosphor layer was 5.7 weight %.
[3] when 57 cm$^3$ of the solution of potassium water glass was added, the $SiO_2$ concentration with respect to the total weight of the phosphor suspension and the cushion solution was 0.77 weight % and the $SiO_2$ concentration in the dried phosphor layer was 5.9 weight %.
[4] when 61 cm$^3$ of the solution of potassium water glass was added, the $SiO_2$ concentration with respect to the total weight of the phosphor suspension and the cushion solution was 0.80 weight % and the $SiO_2$ concentration in the dried phosphor layer was 6.1 weight %.
[5] when 65 cm$^3$ of the solution of potassium water glass was added, the $SiO_2$ concentration with respect to the total weight of the phosphor suspension and the cushion solution was 0.85 weight % and the $SiO_2$ concentration in the dried phosphor layer was 6.3 weight %.
[6] when 69 cm$^3$ of the solution of potassium water glass was added, the $SiO_2$ concentration with respect to the total weight of the phosphor suspension and the cushion solution was 0.90 weight % and the $SiO_2$ concentration in the dried phosphor layer was 6.5 weight %.
[7] when 74 cm$^3$ of the solution of potassium water glass was added, the $SiO_2$ concentration with respect to the total weight of the phosphor suspension and the cushion solution was 0.95 weight % and the $SiO_2$ concentration in the dried phosphor layer was 6.7 weight %.
[8] when 78 cm$^3$ of the solution of potassium water glass was added, the $SiO_2$ concentration with respect to the total weight of the phosphor suspension and the cushion solution was 1.00 weight % and the $SiO_2$ concentration in the dried phosphor layer was 6.9 weight %.
[9] when 83 cm$^3$ of the solution of potassium water glass was added, the $SiO_2$ concentration with respect to the total weight of the phosphor suspension and the cushion solution was 1.05 weight % and the $SiO_2$ concentration in the dried phosphor layer was 7.1 weight %.

The luminance remaining rates of the obtained phosphor screens in the completed cathode ray tubes were investigated. The method of the measurement of the rate was as follows:

34 kV of a plate voltage (screen voltage) was applied to the completed cathode ray tube while a heater voltage was set at 6.3 V and a cathode voltage was set at 180 V. A screen grid voltage (G2 voltage) was adjusted as an electron beam was cut-off. The cathode voltage was decreased to radiate an electron beam and was adjusted as the screen current was at 800 μA. The scanning area of the beam was adjusted to be 114 mm in horizontal and 85 mm in perpendicular by applying a sawtooth wave voltage to a deflection yoke. The beam was focused by applying a current to an electromagnetic focusing coil. A luminance remaining rate was analyzed for eight hours on the area of 0.0075 mm$^2$.

Figure 3:
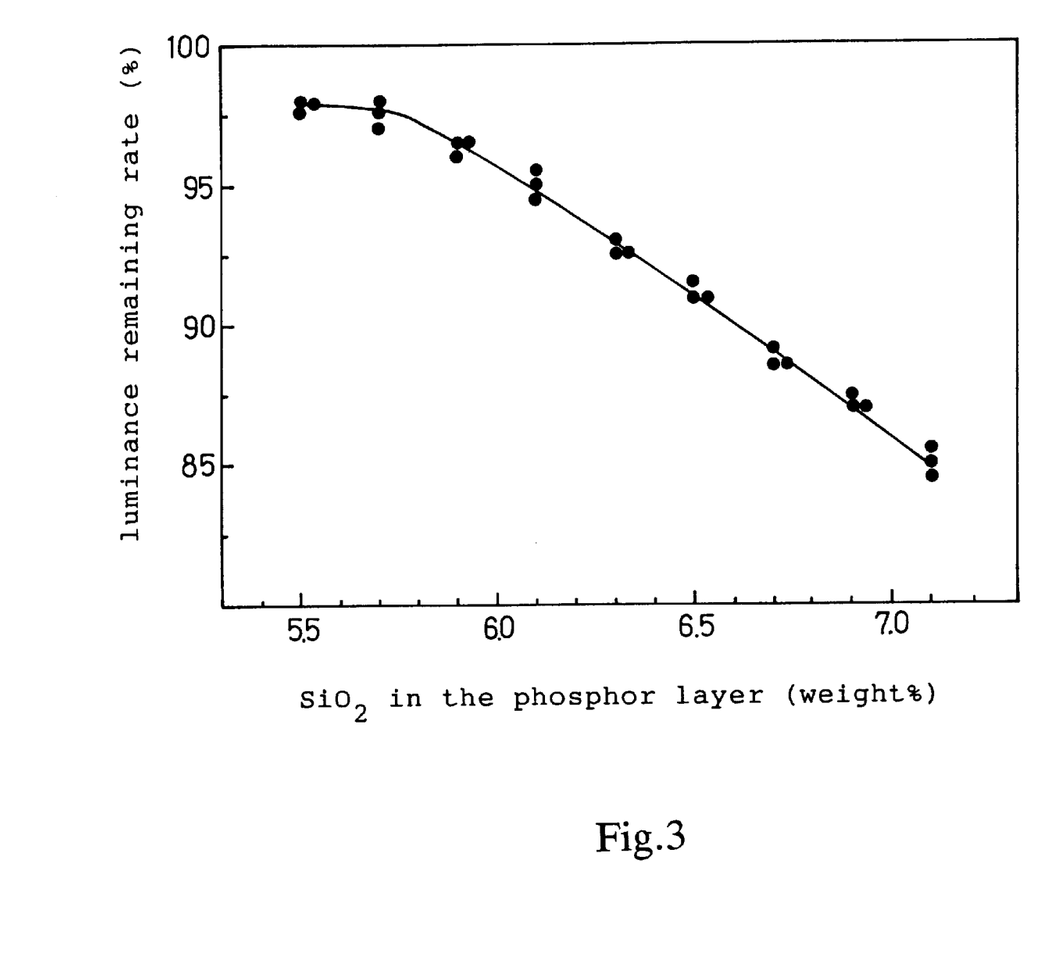
FIG. 3 is a graph showing luminance remaining rate with respect to $SiO_2$ weight concentration in the phosphor layer.
Figure 4:
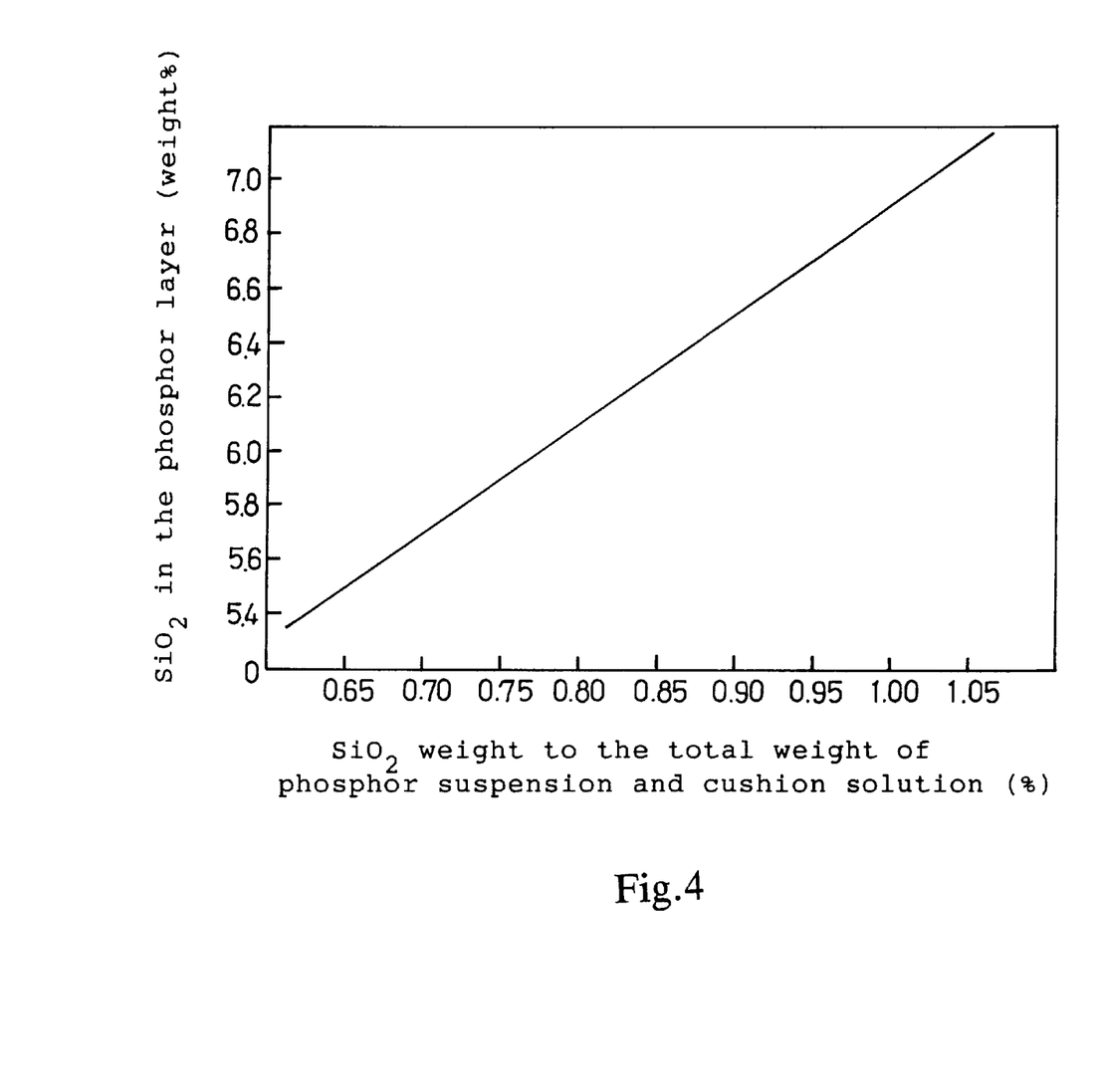
FIG. 4 is a graph showing the relationship between $SiO_2$ concentration in the phosphor layer and $SiO_2$ concentration with respect to the total weight of the phosphor suspension and the cushion solution.

FIG. 3 is a luminance remaining rate graph for the $SiO_2$ concentration in the phosphor layer. As shown in FIG. 3, the deterioration of the luminance remaining rate is improved as the $SiO_2$ is decreased. FIG. 4 shows the relationship between the $SiO_2$ concentration with respect to the total weight of the phosphor suspension and the cushion solution and the $SiO_2$ concentration in the phosphor layer.

Figure 5:
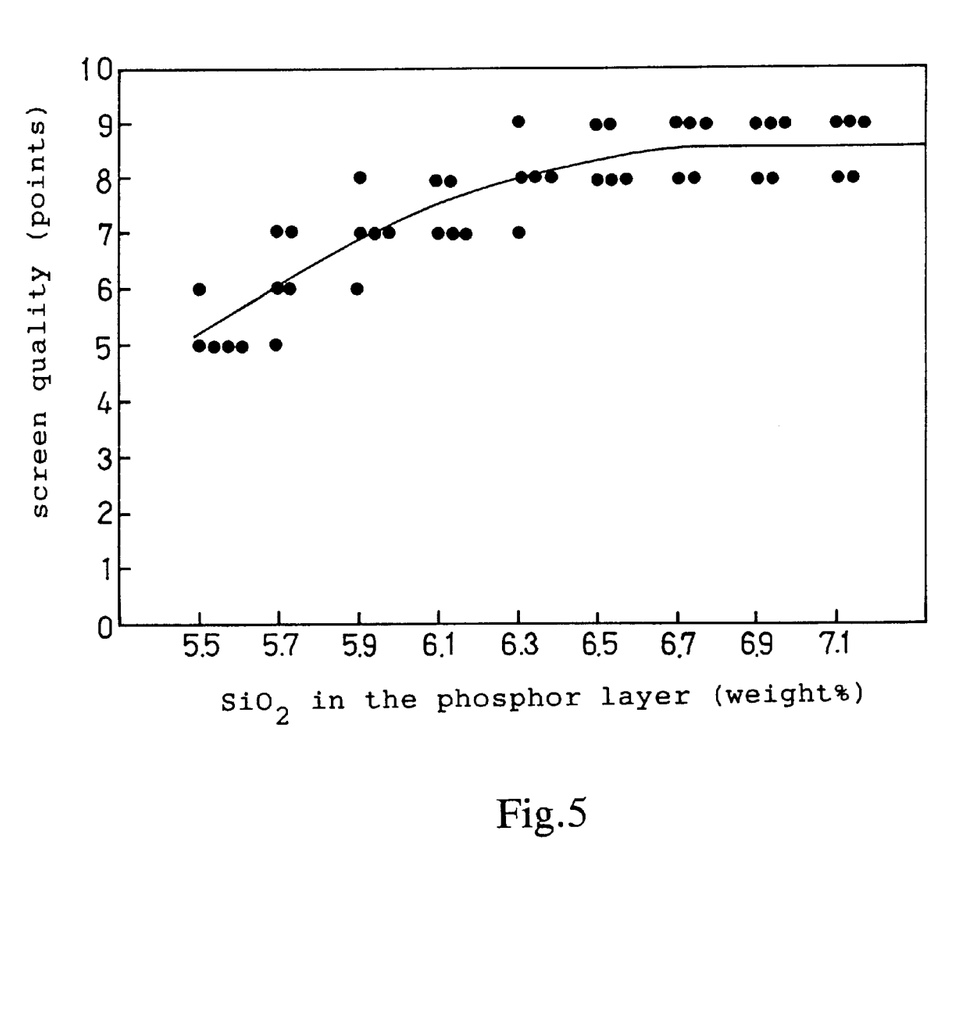
FIG. 5 is a graph showing screen quality with respect to $SiO_2$ concentration in the phosphor layer.

FIG. 5 is a graph showing screen quality with respect to the $SiO_2$ concentration in the phosphor layer. The screen quality was marked organoleptically by observing the phosphor screen by sight. The higher point means finer and less coarse in appearance. As shown in FIG. 5, the screen quality deteriorates when the $SiO_2$ concentration in the phosphor layer is less than 6.7 weight %. When the $SiO_2$ is not included enough to keep the adhesive strength among the phosphor particles tightly, the particles are moved and partially washed away with a supernatant liquid to make the phosphor layer coarse in appearance. Referring to FIG. 4, the water glass needs to be included in at least 0.95 weight % in the mixture of the phosphor suspension and the cushion solution so that the $SiO_2$ may be included in the phosphor layer in at least 6.7 weight % to keep the screen quality better.

Based on the above results, the $SiO_2$ in the phosphor layer, which was produced by a settling method to contain at least 6.7 weight % of $SiO_2$, was rinsed by being sprayed with water and a PVA aqueous solution before forming an organic layer on the phosphor layer in order to obtain a phosphor screen with good quality and an improved luminance remaining rate.

Figure 6:
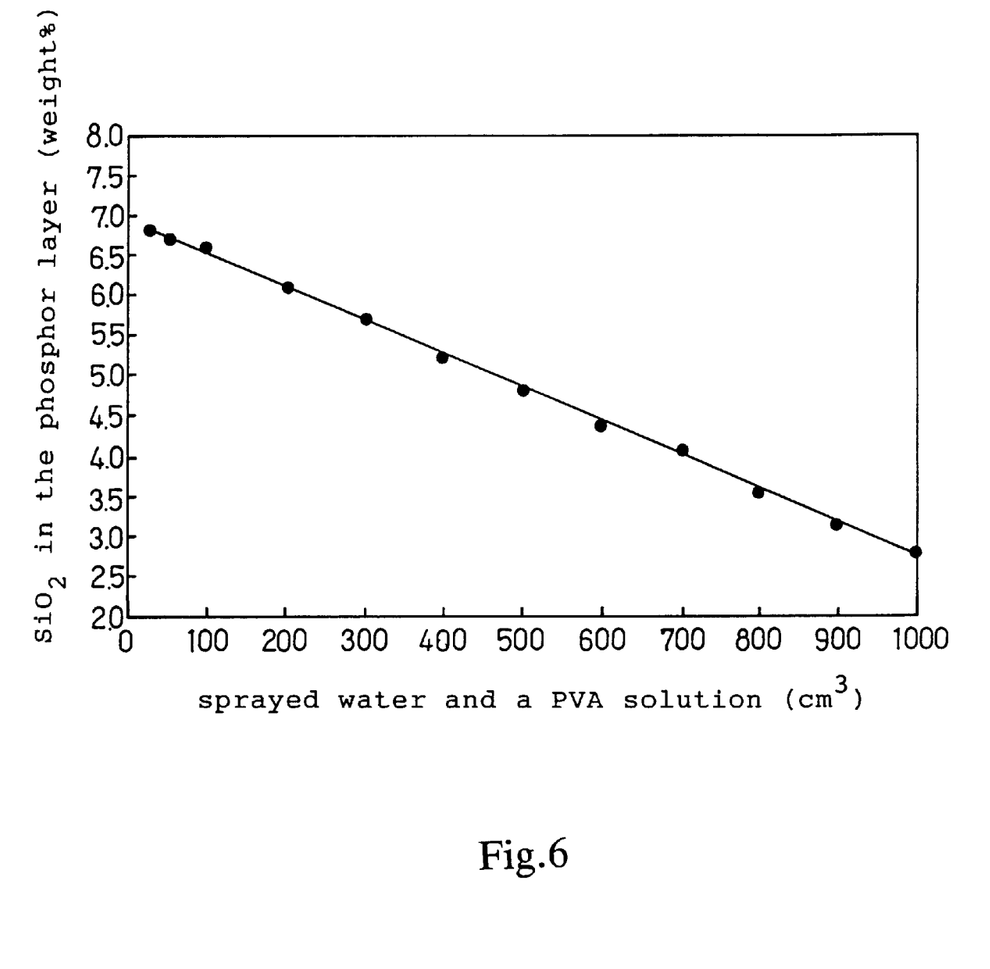
FIG. 6 is a graph showing the relationship between $SiO_2$ concentration in the phosphor layer and the total amount of sprayed water and PVA (polyvinyl alcohol) solution in a spray treatment.

The results are shown in FIG. 6, where the increased amount of deionized water and a PVA aqueous solution sprayed on the phosphor layer rinses more $SiO_2$ out of the phosphor layer so that the $SiO_2$ in the layer decreases more.

Figure 7:
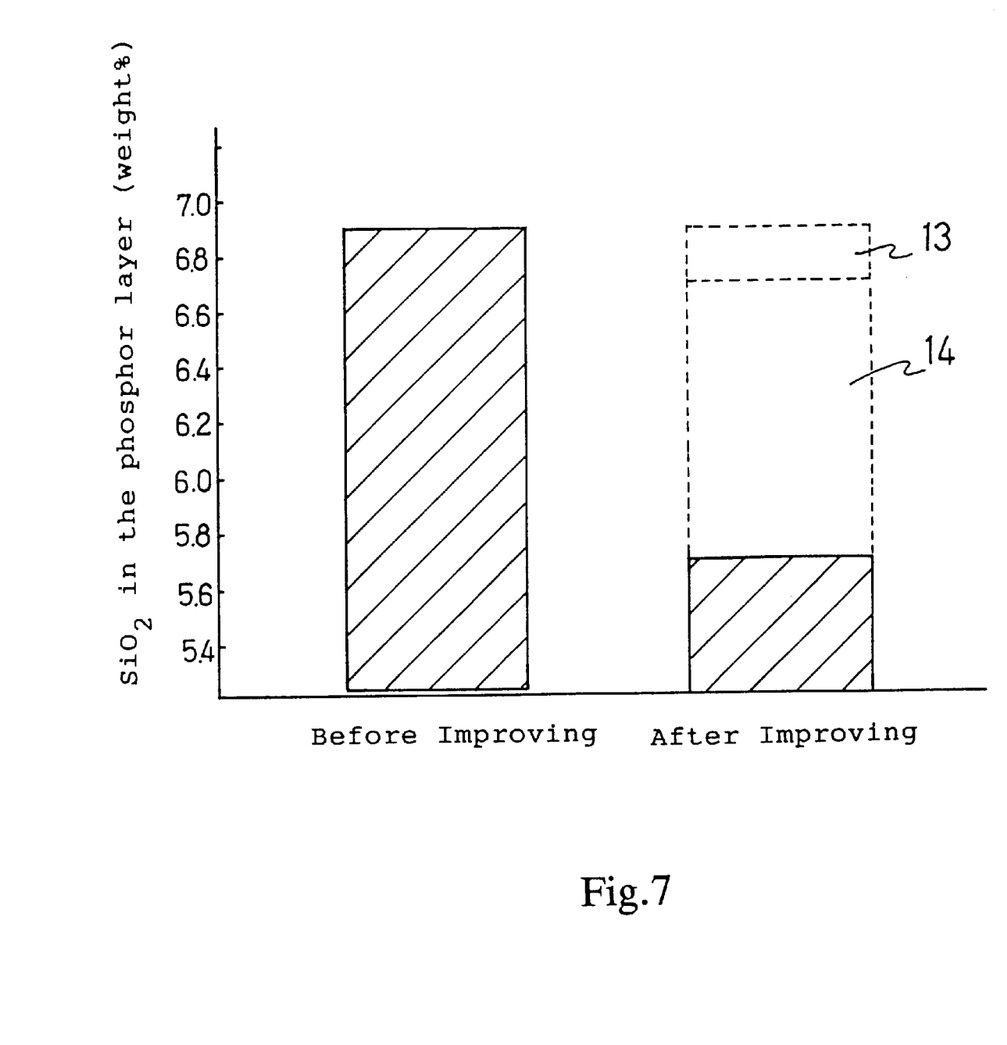
FIG. 7 is a graph showing $SiO_2$ concentration in the phosphor layer for a spray treatment.

FIG. 7 shows the $SiO_2$ in the phosphor layer in the seven-inches glass bulb for the spray treatment with deionized water and a PVA aqueous solution. "Before Improving" in FIG. 7 shows the concentration of the $SiO_2$ in the phosphor layer produced by the process in which the phosphor layer was settled from the suspension including the $SiO_2$ in an amount of 1.00 weight % with respect to the total weight of the phosphor suspension and the cushion solution. "After Improving" in FIG. 7 shows the concentration of the $SiO_2$ in the phosphor layer produced by the process in which the phosphor layer was settled from the phosphor suspension including the $SiO_2$ in an amount of 0.95 weight % with respect to the total weight of the phosphor suspension and the cushion solution and was sprayed with 300 $cm^3$ in total of water and a PVA aqueous solution. In FIG. 7, the amount of $SiO_2$ 13 corresponds to the difference in $SiO_2$ in the phosphor suspension, while the amount of $SiO_2$ 14 corresponds to the amount of $SiO_2$ washed away with water and a PVA solution. Referring to FIG. 3 as well as FIG. 7, the luminance remaining rate in the "After Improving" phosphor layer represents an increase of 12% over that in the "Before Improving" phosphor layer, including an about 7.7% increase with the spray treatment.

Figure 8:
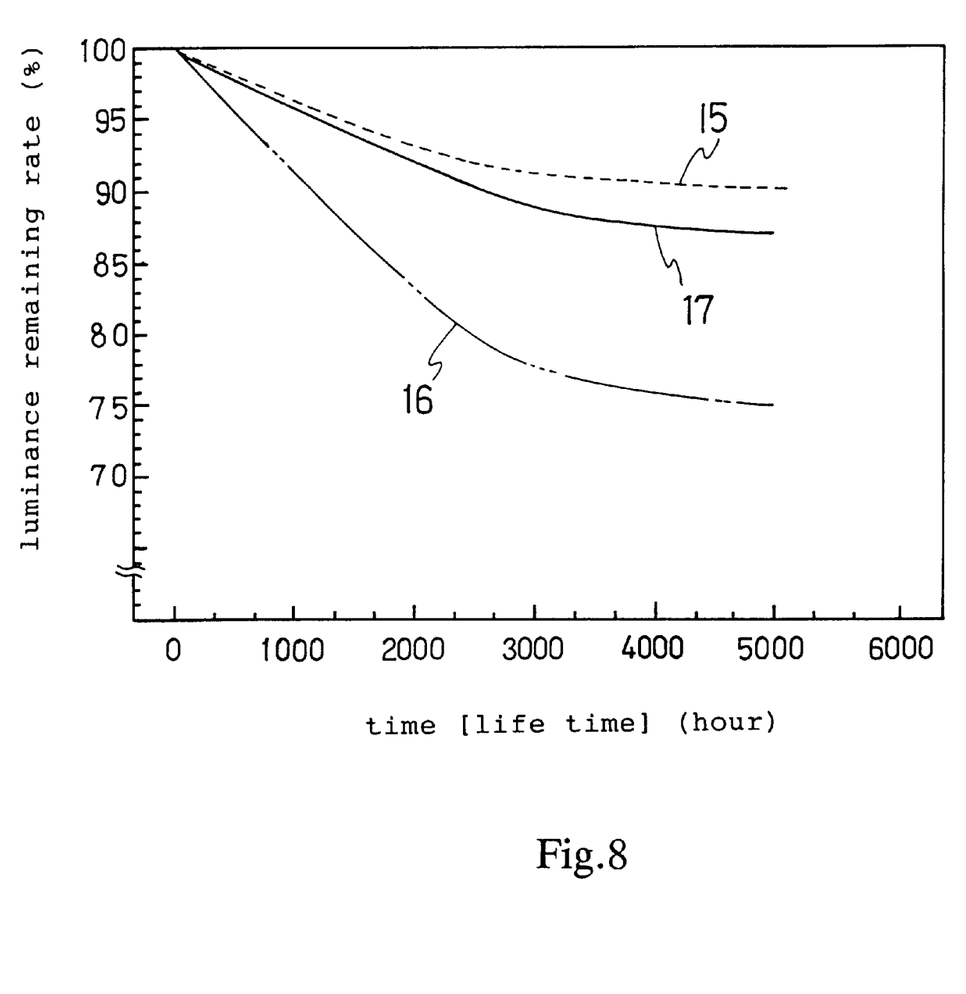
FIG. 8 is a graph showing luminance remaining rate versus time.

FIG. 8 is a graph of luminance remaining rate versus time, showing the luminance remaining properties of seven-inches monochrome cathode ray tubes (a projection tube) with or without the spray treatment in which the phosphor layer is sprayed with deionized water and a PVA solution to make the $SiO_2$ in the layer decrease to 5.7 weight %, and a 14-inches color cathode ray tube for a monitor of a personal computer. As shown in FIG. 8, the seven-inches monochrome cathode ray tube with the spray treatment has an improved life property 17, which is close to that of the color cathode ray tube 15 and better than that of the monochorome cathde ray tube without the spray treatment 16.

The luminance remaining rate of the color cathode ray tube was observed under the condition that the anode voltage was 25 kV, the anode current was 100 $\mu$A and the scanning area of the beam was 114 mm×85 mm, while the luminance remaining rate of the monochrome cathode ray tubes was observed under the condition that the anode voltage was 34 kV, the anode current was 600 $\mu$A and the scanning area of the beam was 114 mm×85 mm.

The invention may be embodied in other forms without departing from the spirit or essential characteristics thereof. The embodiments disclosed in this application are to be considered in all respects as illustrative and not restrictive. The scope of the invention is indicated by the appended claims rather than the foregoing description, and all changes that come within the meaning and range of equivalency of the claims are intended to be embraced therein.

We claim:

1. A process for forming a phosphor screen of a monochrome cathode ray tube, which comprises: settling phosphor particles on the inner surface of a main body of a monochrome cathode ray tube from a phosphor suspension including phosphor particles and $SiO_2$ to form a phosphor layer including the phosphor particles and the $SiO_2$ as a binder for the phosphor particles, drying the phosphor layer, and forming an organic layer on the phosphor layer, wherein the amount of $SiO_2$ in the phosphor layer is reduced by removing from the dried phosphor layer $SiO_2$ not needed as the binder before forming the organic layer.

2. A process according to claim 1, wherein the amount of $SiO_2$ in the phosphor layer is reduced by rinsing the dried phosphor layer with a water-based liquid.

3. A process according to claim 2, wherein the water-based liquid is selected from the group consisting of water, an aqueous solution and a dispersed system including water as a dispersing medium.

4. A process according to claim 3, wherein the water-based liquid is an aqueous solution that includes a polymer as a solute.

5. A process according to claim 3, wherein the water-based liquid is a dispersed system that includes a colloidal silica as a dispersoid.

6. A process according to claim 2, wherein the phosphor layer is rinsed with a water-based liquid in an amount between 60 $cm^3$ and 1000 $cm^3$ per one gram of the phosphor particle.

7. A process according to claim 2, wherein the phosphor layer is rinsed with water and then rinsed with an aqueous solution including a polymer as a solute.

8. A process according to claim 1, wherein the $SiO_2$ is included in the phosphor layer in an amount of not more than 5.7 weight % after the amount is reduced.

9. A process according to claim 1, wherein the $SiO_2$ included in the phosphor suspension is included as alkali silicate.

10. A process according to claim 1, wherein the $SiO_2$ is included in the phosphor suspension in an amount of at least 0.95 weight % with respect to the total weight of the phosphor suspension and a cushion solution held in the main body of the monochrome cathode ray tube before the phosphor suspension is added into the main body.

11. A process according to claim 1, wherein the $SiO_2$ is included in the phosphor layer in an amount of at least 6.7 weight % before the amount is reduced.

12. A phosphor screen of a monochrome cathode ray tube, which comprises a phosphor layer formed by a process comprising:

settling phosphor particles on the inner surface of a main body of a monochrome cathode ray tube from a phosphor suspension including phosphor particles and $SiO_2$ to form a phosphor layer including the phosphor particles and the $SiO_2$ as a binder for the phosphor particles, drying the phosphor layer, and forming an organic layer on the phosphor layer, wherein the amount of $SiO_2$ in the phosphor layer is reduced by removing from the dried phosphor layer $SiO_2$ not needed as the binder before forming the organic layer.

13. A phosphor screen according to claim 12, wherein the amount of $SiO_2$ included in the phosphor layer is not more than 5.7 weight % after the amount is reduced.

14. A monochrome cathode ray tube including a phosphor screen, which comprises a phosphor layer formed by a process comprising:

settling phosphor particles on the inner surface of a main body of a monochrome cathode ray tube from a phosphor suspension including phosphor particles and $SiO_2$ to form a phosphor layer including the phosphor particles and the $SiO_2$ as a binder for the phosphor particles, drying the phosphor layer, and forming an organic layer on the phosphor layer, wherein the amount of $SiO_2$ in the phosphor layer is reduced by removing from the dried phosphor layer $SiO_2$ not needed as the binder before forming the organic layer.

15. A monochrome cathode ray tube according to claim 14, wherein the amount of $SiO_2$ included in the phosphor layer is not more than 5.7 weight % after the amount is reduced.

* * * * *